US009878711B2

United States Patent
Ichinokawa

(10) Patent No.: US 9,878,711 B2
(45) Date of Patent: Jan. 30, 2018

(54) METHOD AND SYSTEM FOR LANE DETECTION AND VALIDATION

(71) Applicant: Honda Motor Co., Ltd., Tokyo (JP)

(72) Inventor: Jumpei Ichinokawa, Rolling Hills Estates, CA (US)

(73) Assignee: Honda Motor Co., Ltd., Tokyo (JP)

( * ) Notice: Subject to any disclaimer, the term of this patent is extended or adjusted under 35 U.S.C. 154(b) by 52 days.

(21) Appl. No.: 14/967,792

(22) Filed: Dec. 14, 2015

(65) Prior Publication Data

US 2017/0166205 A1    Jun. 15, 2017

(51) Int. Cl.
| | |
|---|---|
| *B60W 30/12* | (2006.01) |
| *G08G 1/16* | (2006.01) |
| *G05D 1/02* | (2006.01) |
| *H04L 29/08* | (2006.01) |
| *G05B 19/042* | (2006.01) |
| *G01S 19/48* | (2010.01) |
| *G01S 13/93* | (2006.01) |

(52) U.S. Cl.
CPC ............ *B60W 30/12* (2013.01); *G01S 19/48* (2013.01); *G05B 19/042* (2013.01); *G05D 1/0231* (2013.01); *G05D 1/0278* (2013.01); *G08G 1/167* (2013.01); *H04L 67/12* (2013.01); *B60W 2750/00* (2013.01); *G01S 2013/9325* (2013.01); *G05B 2219/2637* (2013.01)

(58) Field of Classification Search
CPC ............ B60W 30/12; B60W 1750/00; G05B 19/042; G05B 2219/2637; G05D 1/0231; G05D 1/0278; G08G 1/167; H04L 67/12
See application file for complete search history.

(56) References Cited

U.S. PATENT DOCUMENTS

| | | | |
|---|---|---|---|
| 6,560,535 | B2 | 5/2003 | Levy et al. |
| 7,233,683 | B2 | 6/2007 | Han et al. |
| 7,765,066 | B2 | 7/2010 | Braeuchle et al. |
| 7,876,927 | B2 | 2/2011 | Han et al. |
| 8,150,574 | B2 | 4/2012 | Han et al. |
| 8,676,492 | B2 | 3/2014 | Litkouhi et al. |
| 8,996,197 | B2 | 3/2015 | Joh et al. |
| 9,070,022 | B2 | 6/2015 | Park et al. |
| 9,109,907 | B2 | 9/2015 | Park et al. |
| 2007/0055412 | A1 | 3/2007 | Bernhard |
| 2012/0314070 | A1 | 12/2012 | Zhang et al. |
| 2013/0018492 | A1 | 7/2013 | Spero et al. |
| 2015/0241232 | A1 | 8/2015 | Park et al. |

FOREIGN PATENT DOCUMENTS

WO    2013149149    10/2013

OTHER PUBLICATIONS

"SensorFusion for Navigation in Degraded Environments", by David M. Bevly, Professor, Director of the GPS and Vehicle Dynamics Lab, Auburn University, http://gavlab.auburn.edu.

*Primary Examiner* — Jerrah Edwards
*Assistant Examiner* — Mathew Franklin Gordon
(74) *Attorney, Agent, or Firm* — Rankin, Hill & Clark LLP

(57) ABSTRACT

A method and system for lane recognition including determining availability of vehicle position data obtained from more than one source including a GPS device source and an imaging device source. The method includes modifying a lane error threshold based on the availability of the vehicle position data. The lane error threshold is a lateral distance from a centerline of a lane. The method includes validating lane recognition data based on the lane error threshold.

20 Claims, 6 Drawing Sheets

METHOD AND SYSTEM FOR LANE DETECTION AND VALIDATION

BACKGROUND

Vehicle systems can use various types of data for lane recognition. Lane recognition can be used by advanced driving assistance systems, for example, lane keep assist systems. Some vehicle systems can use satellite data, image data, or mapping data for lane recognition. Satellite data can be obtained by a Global Positioning Systems (GPS) or Differential Global Positioning Systems (DGPS). These positioning systems operate by using signals received from one or more satellite receivers. In some instances, the signals received from the satellite receivers can be blocked, for example, due to man-made obstructions or natural circumstances. Image data related to a current road and/or lane the vehicle is travelling on can be obtained from cameras and/or sensors located on and/or around the vehicle. In some cases, the image data can be skewed or unavailable due to man-made obstructions or lighting conditions. Further, in some instances, the satellite positioning systems and/or the imaging sources that capture image data may not be working properly or may be inactive.

BRIEF DESCRIPTION

According to one aspect, a computer-implemented method for lane recognition includes determining availability of vehicle position data obtained from more than one source including a GPS device source and an imaging device source. The method includes modifying a lane error threshold based on the availability of the vehicle position data. The lane error threshold is a lateral distance from a centerline of a lane. The method includes validating lane recognition data based on the lane error threshold.

According to another aspect, a system for lane recognition includes a vehicle position data source including a GPS device source and an imaging device source, and a processor operatively connected for computer communication the vehicle data position source. The processor includes a vehicle position data source module to determine availability of vehicle position data obtained from the GPS device source and the imaging device source. The processor includes a lane error module to modify lane error threshold based on the availability of the vehicle position data. The lane error threshold is a lateral distance from a centerline of a lane. The processor includes a lane recognition module to validate lane recognition data based on the lane error threshold.

According to a further aspect, a non-transitory computer-readable medium storing computer-executable instructions that when executed by a computer, which includes at least a processor, cause the computer to perform a method. The method includes determining availability of vehicle position data obtained from a GPS device source and an imaging device source based on a device status obtained from the GPS device source and a device status obtained from the imaging device source. The method includes calculating a modified lane error threshold based on the availability of the vehicle position data. The method includes validating lane recognition data based on the modified lane error threshold.

BRIEF DESCRIPTION OF THE DRAWINGS

The novel features believed to be characteristic of the disclosure are set forth in the appended claims. In the descriptions that follow, like parts are marked throughout the specification and drawings with the same numerals, respectively. The drawing figures are not necessarily drawn to scale and certain figures may be shown in exaggerated or generalized form in the interest of clarity and conciseness. The disclosure itself, however, as well as a preferred mode of use, further objects and advances thereof, will be best understood by reference to the following detailed description of illustrative embodiments when read in conjunction with the accompanying drawings, wherein:

DETAILED DESCRIPTION

Figure 1:
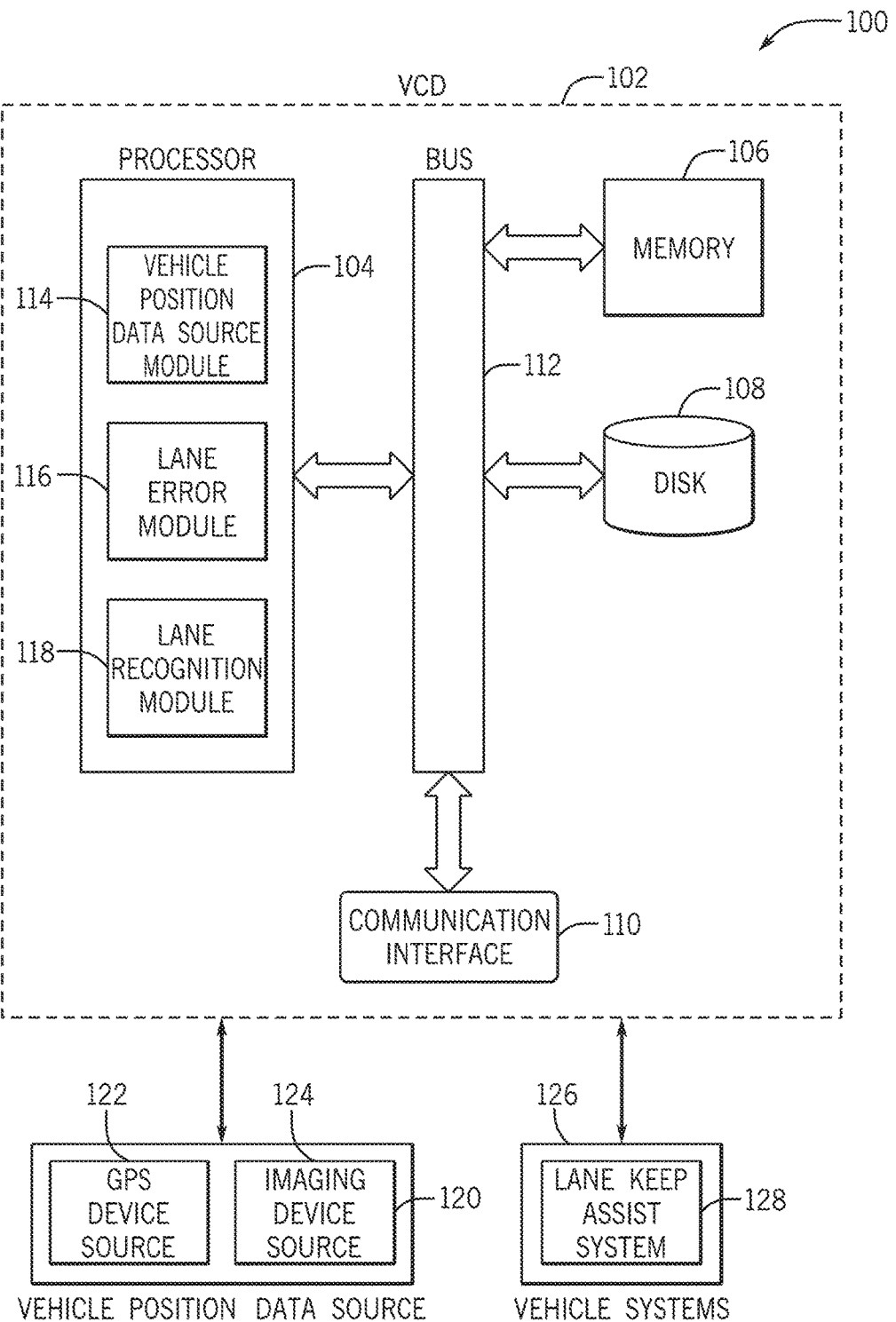
FIG. 1 is a schematic block diagram illustrating an exemplary operating environment and exemplary system implementing lane recognition in accordance with one embodiment.

The following includes definitions of selected terms employed herein. The definitions include various examples and/or forms of components that fall within the scope of a term and that can be used for implementation. The examples are not intended to be limiting. Further, the components discussed herein, can be combined, omitted or organized with other components or into organized into different architectures.

A "bus," as used herein, refers to an interconnected architecture that is operably connected to other computer components inside a computer or between computers. The bus can transfer data between the computer components. The bus can be a memory bus, a memory controller, a peripheral bus, an external bus, a crossbar switch, and/or a local bus, among others. The bus can also be a vehicle bus that interconnects components inside a vehicle using protocols such as Media Oriented Systems Transport (MOST), Controller Area network (CAN), Local Interconnect Network (LIN), among others.

"Computer communication", as used herein, refers to a communication between two or more computing devices (e.g., computer, personal digital assistant, cellular telephone, network device) and can be, for example, a network transfer, a file transfer, an applet transfer, an email, a hypertext transfer protocol (HTTP) transfer, and so on. A computer communication can occur across, for example, a wireless system (e.g., IEEE 802.11), an Ethernet system (e.g., IEEE 802.3), a token ring system (e.g., IEEE 802.5), a local area network (LAN), a wide area network (WAN), a point-to-point system, a circuit switching system, a packet switching system, among others.

"Computer-readable medium," as used herein, refers to a non-transitory medium that stores instructions and/or data. A computer-readable medium may take forms, including, but not limited to, non-volatile media, and volatile media. Non-volatile media may include, for example, optical disks, magnetic disks, and so on. Volatile media may include, for example, semiconductor memories, dynamic memory, and so on. Common forms of a computer-readable medium may include, but are not limited to, a floppy disk, a flexible disk, a hard disk, a magnetic tape, other magnetic medium, an ASIC, a CD, other optical medium, a RAM, a ROM, a memory chip or card, a memory stick, and other media from which a computer, a processor or other electronic device can read.

A "disk," as used herein can be, for example, a magnetic disk drive, a solid-state disk drive, a floppy disk drive, a tape drive, a Zip drive, a flash memory card, and/or a memory stick. Furthermore, the disk can be a CD-ROM (compact disk ROM), a CD recordable drive (CD-R drive), a CD rewritable drive (CD-RW drive), and/or a digital video ROM drive (DVD ROM). The disk can store an operating system that controls or allocates resources of a computing device.

A "memory," as used herein can include volatile memory and/or nonvolatile memory. Non-volatile memory can include, for example, ROM (read only memory), PROM (programmable read only memory), EPROM (erasable PROM), and EEPROM (electrically erasable PROM). Volatile memory can include, for example, RAM (random access memory), synchronous RAM (SRAM), dynamic RAM (DRAM), synchronous DRAM (SDRAM), double data rate SDRAM (DDRSDRAM), and direct RAM bus RAM (DRRAM). The memory can store an operating system that controls or allocates resources of a computing device.

A "module," as used herein, includes, but is not limited to, non-transitory computer readable medium that stores instructions, instructions in execution on a machine, hardware, firmware, software in execution on a machine, and/or combinations of each to perform a function(s) or an action(s), and/or to cause a function or action from another module, method, and/or system. A module may also include logic, a software controlled microprocessor, a discrete logic circuit, an analog circuit, a digital circuit, a programmed logic device, a memory device containing executing instructions, logic gates, a combination of gates, and/or other circuit components. Multiple modules may be combined into one module and single modules may be distributed among multiple modules.

An "operable connection," or a connection by which entities are "operably connected," is one in which signals, physical communications, and/or logical communications can be sent and/or received. An operable connection can include a wireless interface, a physical interface, a data interface, and/or an electrical interface.

A "processor," as used herein, processes signals and performs general computing and arithmetic functions. Signals processed by the processor can include digital signals, data signals, computer instructions, processor instructions, messages, a bit, a bit stream, that can be received, transmitted and/or detected. Generally, the processor can be a variety of various processors including multiple single and multi-core processors and co-processors and other multiple single and multicore processor and co-processor architectures. The processor can include various modules to execute various functions.

A "vehicle," as used herein, refers to any moving vehicle that is capable of carrying one or more human occupants and is powered by any form of energy. The term "vehicle" includes, but is not limited to cars, trucks, vans, minivans, SUVs, motorcycles, scooters, boats, go-karts, amusement ride cars, rail transport, personal watercraft, and aircraft. In some cases, a motor vehicle includes one or more engines. Further, the term "vehicle" can refer to an electric vehicle (EV) that is capable of carrying one or more human occupants and is powered entirely or partially by one or more electric motors powered by an electric battery. The EV can include battery electric vehicles (BEV) and plug-in hybrid electric vehicles (PHEV). The term "vehicle" can also refer to an autonomous vehicle and/or self-driving vehicle powered by any form of energy. The autonomous vehicle may or may not carry one or more human occupants. Further, the term "vehicle" can include vehicles that are automated or non-automated with pre-determined paths or free-moving vehicles.

A "vehicle system," as used herein can include, but is not limited to, any automatic or manual systems that can be used to enhance the vehicle, driving, and/or safety. Exemplary vehicle systems include, but are not limited to: an electronic stability control system, an anti-lock brake system, a brake assist system, an automatic brake prefill system, a low speed follow system, a cruise control system, a collision warning system, a collision mitigation braking system, an auto cruise control system, a lane departure warning system, a blind spot indicator system, a lane keep assist system, a navigation system, a transmission system, brake pedal systems, an electronic power steering system, visual devices (e.g., camera systems, proximity sensor systems), a climate control system, an electronic pretensioning system, a monitoring system, a passenger detection system, a vehicle suspension system, a vehicle seat configuration system, a vehicle cabin lighting system, an audio system, a sensory system, among others.

Referring now to the drawings, wherein the showings are for purposes of illustrating one or more exemplary embodiments and not for purposes of limiting the same, FIG. 1 is a schematic block diagram illustrating an exemplary operating environment and exemplary system implementing lane recognition according to one embodiment. The components of the environment 100 as well as the components of other systems, hardware architectures, and software architectures discussed herein, can be combined, omitted, or organized into different architectures for various embodiments. Further, as will be discussed herein, the components of the environment 100 can be implemented with or associated with a vehicle (See FIG. 2, a vehicle 202).

In the embodiment shown in FIG. 1, the environment 100 includes a vehicle computing device 102 (VCD) with provisions for processing, communicating and interacting with various components of a vehicle (e.g., a vehicle 202 of FIG. 2) and other components of the environment 100. In one embodiment, the VCD 102 can be implemented within a vehicle (e.g., a vehicle 202 of FIG. 2), for example, as part of a telematics unit, a head unit, a navigation unit, an infotainment unit, an electronic control unit, among others. In other embodiments, the components and functions of the VCD 102 can be implemented remotely from the vehicle, for example, with a portable device (not shown) or another device connected via a network (not shown). Exemplary devices can include wearable devices, network storage devices, connected vehicles, other networks (e.g., V2V networks), among others.

Generally, the VCD 102 includes a processor 104, a memory 106, a disk 108, and a communication interface 110, which are each operably connected for computer communication via a bus 112 and/or other wired and wireless technologies. The communication interface 110 provides software and hardware to facilitate data input and output between the components of the VCD 102 and other components, networks, and data sources, which will be described herein. Additionally, the processor 104 includes a vehicle position data source module 114, a lane error module 116, and a lane recognition module 118, each suitable for providing lane recognition by the components of the environment 100.

The VCD 102 is also operably connected for computer communication (e.g., via the bus 112 and/or the communication interface 110) to a vehicle position data source 120. The vehicle position data source 120 can include one or more components that obtain and/or determine vehicle position data (e.g., coordinate data of the vehicle). In FIG. 1, the vehicle position data source 120 can also obtain map data (not shown), stored, for example, in the memory 106 and/or the disk 108. The map data can be used in conjunction with the vehicle position data obtained by the vehicle position data source 120.

Figure 2:
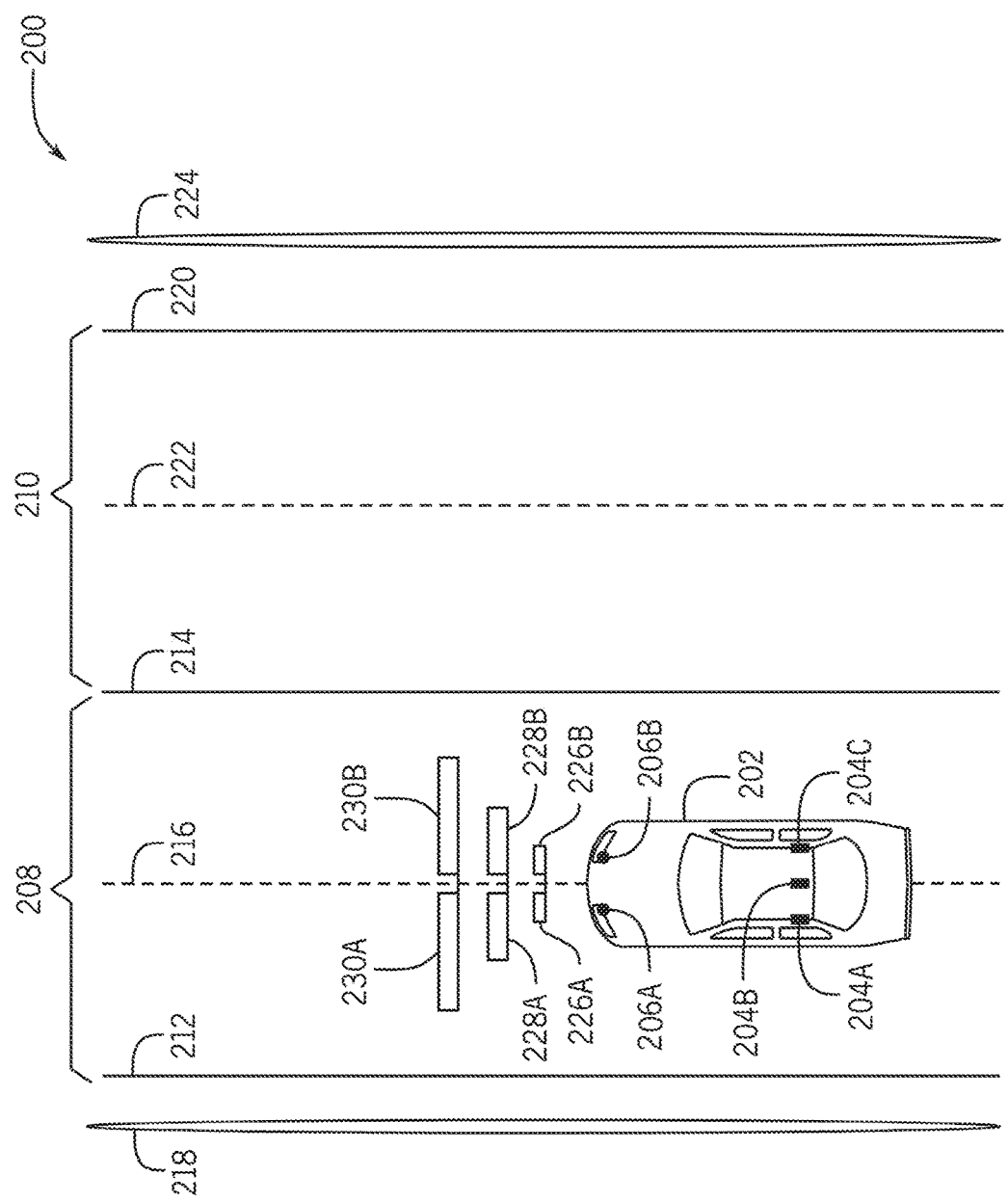
FIG. 2 illustrates an exemplary illustrative view of a vehicle travelling on a road implementing systems and methods for lane recognition in accordance with one embodiment.

In FIG. 1, the vehicle position data source 120 includes a GPS device source 122 and an imaging device source 124. The GPS device source 122 can receive vehicle position data utilizing position data from satellite receivers. In some embodiments, the GPS device source 122 is a DGPS device source. Referring now to FIG. 2 and with reference to the components of FIG. 1, an illustrative view 200 of a vehicle 202 travelling along a road is shown. The vehicle 202 can implement the methods and systems discussed herein for lane recognition. The vehicle 202 can include one or more GPS device sources 122. For example, in FIG. 2, exemplary GPS device sources 122 are shown as 204a, 204b, and 204c. More specifically, the GPS device source 204a is located on top of the vehicle 202 to the left of a center of the vehicle 202. The GPS device source 204b is located on top of the vehicle 202 at a center of the vehicle 202. The GPS device source 204c is located on top of the vehicle 202 to the right of a center of the vehicle 202. The locations of the GPS device sources in FIG. 2 are exemplary and other locations and/or configurations can be implemented. Further, any number (e.g., one, more than one, more than three) of GPS device sources can be implemented.

Referring again to FIG. 1, the imaging device source 124 can receive vehicle position data using vehicle sensors and/or cameras that can be a part of one or more vehicle systems 126. For example, the vehicle sensors and/or cameras can include LIDAR sensors, cameras, and radar sensors, among others, positioned on various locations of the vehicle. The imaging device source 124 can capture images including vehicle position data relating to the current road on which a vehicle is travelling. Vehicle position data can include lane markings, lane boundaries, other vehicles on the road, among others. In FIG. 2, imaging device sources 124 are shown in various positions of the vehicle 202. Specifically, in FIG. 2, an imaging device source 206a is positioned on the front of the vehicle 202 on the left side of the vehicle 202 (e.g., left of center of the vehicle 202). Further, an imaging device source 206b is positioned on the front of the vehicle 202 on the right side of the vehicle 202 (e.g., right of center of the vehicle 202). The locations of the imaging device sources in FIG. 2 are exemplary and other locations and/or configurations can be implemented. Further, any number (e.g., one, more than one, more than two) of imaging device sources can be implemented.

As mentioned above, the environment 100 can include various vehicle systems 126. The vehicle systems 126 can include vehicle systems that utilize the lane recognition methods and systems discussed herein. For example, the vehicle systems can include a lane keep assist system 128. In some embodiments, the lane keep assist system 128 can include one or more of the vehicle position data sources 120. For example, the lane keep assist system 128 can include an imaging device source 124 that captures images including vehicle position data relating to the current road on which a vehicle is travelling. Vehicle position data can include lane markings, lane boundaries, other vehicles on the road, among others.

FIG. 1 will now be described in operation according to an exemplary embodiment. As discussed above with FIG. 1, a system for lane recognition can include the vehicle position data source 120 including the GPS device source 122 and the imaging device source 124. Further, the processor 104 can be operatively connected to for computer communication to the vehicle data position source 120. The processor 104, as discussed above, can include the vehicle position data source module 114 to determine availability of vehicle position data obtained from the GPS device source 122 and the imaging device source 124. For example, in some instances, the GPS device source 122 cannot obtain vehicle position data or may obtained skewed vehicle position data. The unavailability of the vehicle position data can be a result of natural circumstances, for example, weather conditions that can inhibit the GPS device source 122 from obtaining signals from satellite receivers. In other circumstances, man-made obstacles (e.g., tunnels, barriers, bridges) can inhibit the GPS device source 122 from obtaining signals from satellite receivers. In other examples, the GPS device source 122 can be turned OFF (i.e., inactive) or malfunctioning. In these examples, vehicle position data may not be available from the GPS device source 122.

With respect to the imaging device source 124, the imaging device source 124 may not be able to obtain vehicle position data or may obtain skewed images including vehicle position data. For example, weather conditions (e.g., fog, light) may make it difficult or not possible to obtain images. In another example, lane markings and/or lane boundaries could be obstructed or difficult to capture. In another example, the imaging device source 124 can be turned OFF (i.e., inactive) or malfunctioning. In these examples, vehicle position data may not be available from the imaging device sources 124.

In one embodiment, the vehicle position data source module 114 can determine availability of the vehicle position data obtained from the GPS device source 122 and the imaging device source 124 based on a device status obtained by the vehicle position data source module 114 from the GPS device source 122 and a device status obtained by the vehicle position data source module 114 from the imaging device source 124. For example, the vehicle position data source module 144 can receive a signal from the GPS device source 122 and/or the imaging device source 124 indicating a device status (e.g., ON, OFF, failure). If the device status is OFF or failure, the vehicle position data source module 114 can determine that the vehicle position data from the respective source based on the device status in unavailable. If the device status is ON, the vehicle position data source module 114 can determine that the vehicle position data from the respective source based on the device status is available. Further, in other embodiments, the vehicle position data source module 114 can query the GPS device source 122 and/or the imaging device source 124 for a device status (e.g., ON, OFF, failure).

In other embodiments, the vehicle position data source module 144 can determine availability of the vehicle position data obtained from the GPS device source 122 and the imaging device source 124 by analyzing the quality of the vehicle position data received. For example, if the quality of the images received from the imaging device source 124 is poor, the vehicle position data source module 144 can determine that vehicle position data obtained from the imaging device source 124 is unavailable. In another embodiment, the vehicle position data source module 144 can determine availability of the vehicle position data based on the current location of the vehicle (e.g., based on map data) and environmental conditions. For example, current weather conditions and/or light conditions can prevent the imaging device source 124 from obtaining vehicle position data (e.g., images) or the vehicle position data can be skewed. In another example, based on the current location of the vehicle, the vehicle position data source module 114 can determine that the vehicle is currently travelling in a tunnel and therefrom vehicle position data from the GPS device source 122 can be unavailable and/or skewed.

As discussed above, the processor 104 can also include the lane error module 116. The lane error module 116 can modify a lane error threshold based on the availability of the vehicle position data. Said differently, the lane error module 114 can modify a lane error threshold based on the availability of the vehicle position data from a specific vehicle position data source 120, for example, the GPS device source 122, and/or the imaging device source 124. The lane error threshold is a lateral distance from a centerline of a lane. In some embodiments, a lane error threshold is associated with a left side of the centerline, specifically, a lateral distance to the left of the centerline. Similarly, in some embodiments, a lane error threshold is associated with a right side of the centerline, specifically, a lateral distance to the right of the centerline.

As will be discussed herein, the lane error threshold is used for lane recognition, to determine whether a vehicle is a certain lane and/or deviating from a certain lane. Thus, the vehicle position from the centerline of the lane exceeds the lane error threshold, the vehicle can be determine to be in a different lane and/or the vehicle position data can be discarded for lane recognition determinations. The lane error threshold can be stored, for example, in the memory 106 and/or the disk 108. The lane error threshold can be an initial lane error threshold that is predetermined. For example, an initial lane error threshold can be 50 cm to the left or the right of the centerline of the lane in which the vehicle is currently travelling. In some embodiments, the lane error threshold can be different based on the direction from the centerline, specifically, a lane error threshold for a lateral distance to the left of the centerline and a lane error threshold for a lateral distance to the right of the centerline.

Referring again to FIG. 2, exemplary lane error thresholds, that can be modified, are shown. The vehicle 202 is shown travelling in a lane 208. The lane 208 is adjacent a lane 210. The lane 208 includes a left lane marker 212 and a right lane marker 214. Further, the lane 208 includes a centerline 216. The lane 208 can also include a lane boundary 218, for example, a curb. The lane boundary 218 can be identified as a lane marker, for example, if the left lane marker 212 is missing, the lane boundary 218 can be used a lane marker for determining what lane the vehicle 202 is currently travelling. The lane 210 also includes a left lane marker 212 that is shared as the right lane marker 214 of the lane 208. Further, the lane 210 includes a right lane marker 220 and a centerline 222. Similar to lane 208, the lane 210 can include a lane boundary 224, for example, a curb. The lane boundary 224 can be identified as a lane marker, for example if the right lane marker 220 is missing.

In FIG. 2, exemplary lane error thresholds are shown that will be described in more detail herein. The lane error thresholds in FIG. 2 can include a lane error threshold 226a to the left of the centerline 216 and a lane error threshold 226b to the right of the centerline 216. Further, a lane error threshold 228a to the left of the centerline 216 and a lane error threshold 228b to the right of the centerline 216 are shown, which are larger error thresholds than the lane error thresholds 226a and 226b. Additionally, a lane error threshold 230a to the left of the centerline 216 and a lane error threshold 230b to the right of the centerline 216 are shown, which are larger error thresholds than the lane error thresholds 226a, 226b, 228a, and 228b. The determination and modification of these thresholds will be described in more detail herein.

Accordingly, in one embodiment, upon the vehicle position data source module 114 determining the vehicle position data obtained from the GPS device source 122 is unavailable, the lane error module 116 modifies the lane error threshold by decreasing the lane error threshold. Thus, with reference to FIG. 2, if the initial lane error thresholds are initially the lane error threshold 228a and 228b at 50 cm, the lane error module 116 can modify the lane error threshold 228a and 228b by decreasing these thresholds to the lane error thresholds 226a and 226b at 20 cm. In some embodiments, the lane error thresholds can be modified based on the lateral direction from the centerline. For example, a lane error threshold for a lateral distance to the left of the centerline may be decreased to 20 cm while a lateral error threshold for a lateral distance to the right of the centerline may be decreased to 10 cm.

In another embodiment, upon the vehicle position data source module 114 determining the vehicle position data obtained from the GPS device source 122 is available and the vehicle position data obtained from the imaging device source 124 is available, the lane error module 116 modifies the lane error threshold by increasing the lane error threshold. Referring again to FIG. 2, if the initial lane error thresholds are the lane error threshold 228a and 228b at 50 cm, the lane error module 116 can modify the lane error threshold 228a and 228b by increasing these thresholds to the lane error thresholds 230a and 230b at 125 cm. The lane error thresholds discussed herein and the modifications (e.g., increasing, decreasing) are exemplary in nature and other threshold amounts can be implemented.

In an alternative embodiment, the vehicle position data source module 114 can determine a location of the GPS device source 122 or a location of the imaging device source 124. Accordingly, the lane error module 116 can modify the lane error threshold based on the location of the GPS device source 122 or the location of the imaging device source 124. Said differently, the vehicle position data source module 114 can determine the availability of the position data based on the location of the GPS device source 122 or the location of the imaging device source 124 and the lane error module 116 can modify the lane error threshold accordingly. For example, with reference to FIG. 2, the GPS device source 122 can be off-centered from the vehicle 202. This can cause vehicle position data that may be skewed or unavailable. As shown in FIG. 2, the GPS device source 204a and the GPS device source 204c are not centered on the vehicle 202, as opposed to the GPS device source 204b. Accordingly, if the vehicle position data source module 114 determines the location of the GPS device source 122 is off-centered from the vehicle 202, the lane error module 116 can modify the lane error threshold. In one embodiment, if the GPS device source 122 is off-centered to the left of the vehicle 202, a lane error threshold for a lateral distance to the left of the centerline can be modified, while a lane error threshold for a lateral distance to the right of the centerline is maintained.

In another example, the imaging device source 124 can be off-centered from the vehicle 202 and/or calibrated incorrectly. For example, as shown in FIG. 2, the imaging device source 206a and 206b are off-centered from the vehicle (e.g., from a centerline of the vehicle 202). Accordingly, data from the imaging device source 206a and 206b can be skewed and/or unavailable.

Referring again to FIG. 1, the available vehicle position data and the lane error threshold is used to validate lane recognition data. Specifically, the lane recognition module 118 validates lane recognition data based on the lane error threshold. Thus, if the lane recognition module 118 receives lane recondition data and/or vehicle position data (e.g., from a map database), the lane recognition data can be validated using the lane error threshold. For example, a distance of the vehicle from a centerline of the lane to the lane error threshold can be compared. Based on the comparison, the distance of the vehicle from the centerline can be discarded and/or used for further calculations of lane recognition, for example, by the lane keep assist system 128. As an illustrative example, if a distance from a centerline of the lane is greater than the lane error threshold, the distance from the centerline and/or the current position of the vehicle may be discarded.

Figure 3:
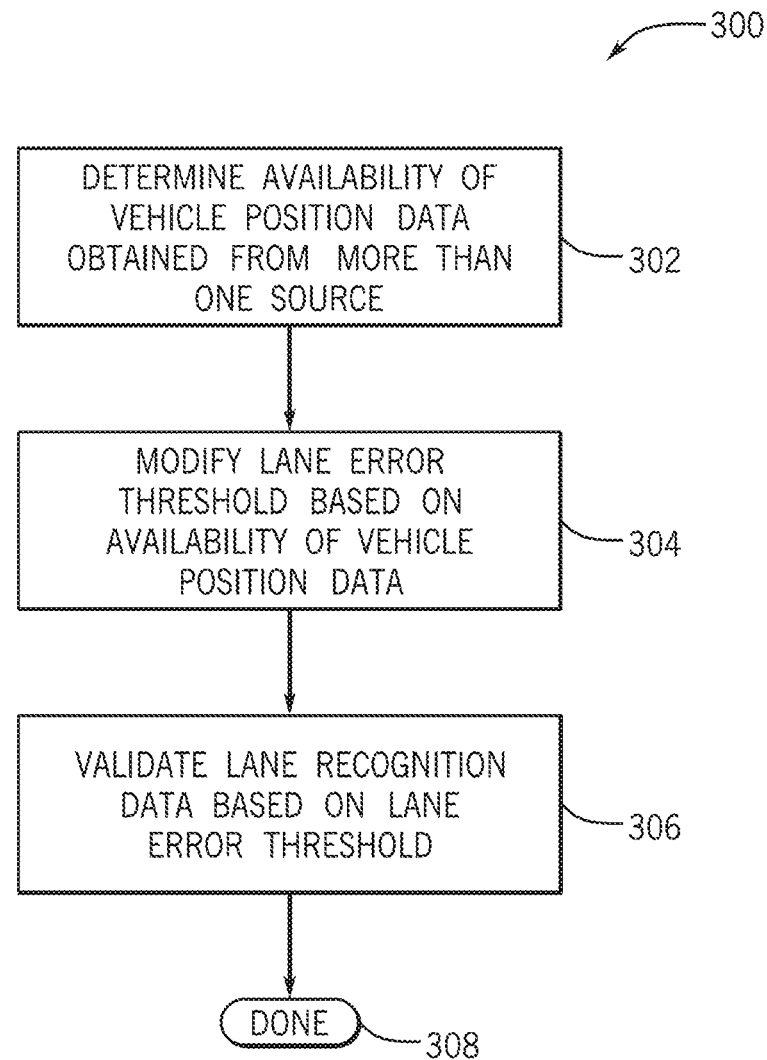
FIG. 3 is a flow diagram of an exemplary method for lane recognition according to an embodiment.

Referring now to FIG. 3, an exemplary method 300 for lane recognition will be described. FIG. 3 will be described with reference to FIGS. 1 and 2. The method includes at block 302, determining availability of vehicle position data obtained from more than one source including a GPS device source and an imaging device source. For example, the vehicle position data source module 114 can determine the availability of vehicle position data obtained from the GPS lane error module 116 and the imaging device source 124.

As discussed above with FIG. 1, in one embodiment, determining availability of vehicle position data obtained from a GPS device source and an imaging device source based on a device status obtained from the GPS device source and a device status obtained from the imaging device source is provided. Thus, for example, the vehicle position data source module 144 can receive a signal from the GPS device source 122 and/or the imaging device source 124 indicating a device status (e.g., ON, OFF, failure). If the device status is, OFF or failure, the vehicle position data source module 114 can determine that the vehicle position data from the respective source based on the device status in unavailable. If the device status is ON, the vehicle position data source module 114 can determine that the vehicle position data from the respective source based on the device status is available. Further, in other embodiments, the vehicle position data source module 114 can query the GPS device source 122 and/or the imaging device source 124 for a device status (e.g., ON, OFF, failure).

Figure 4:
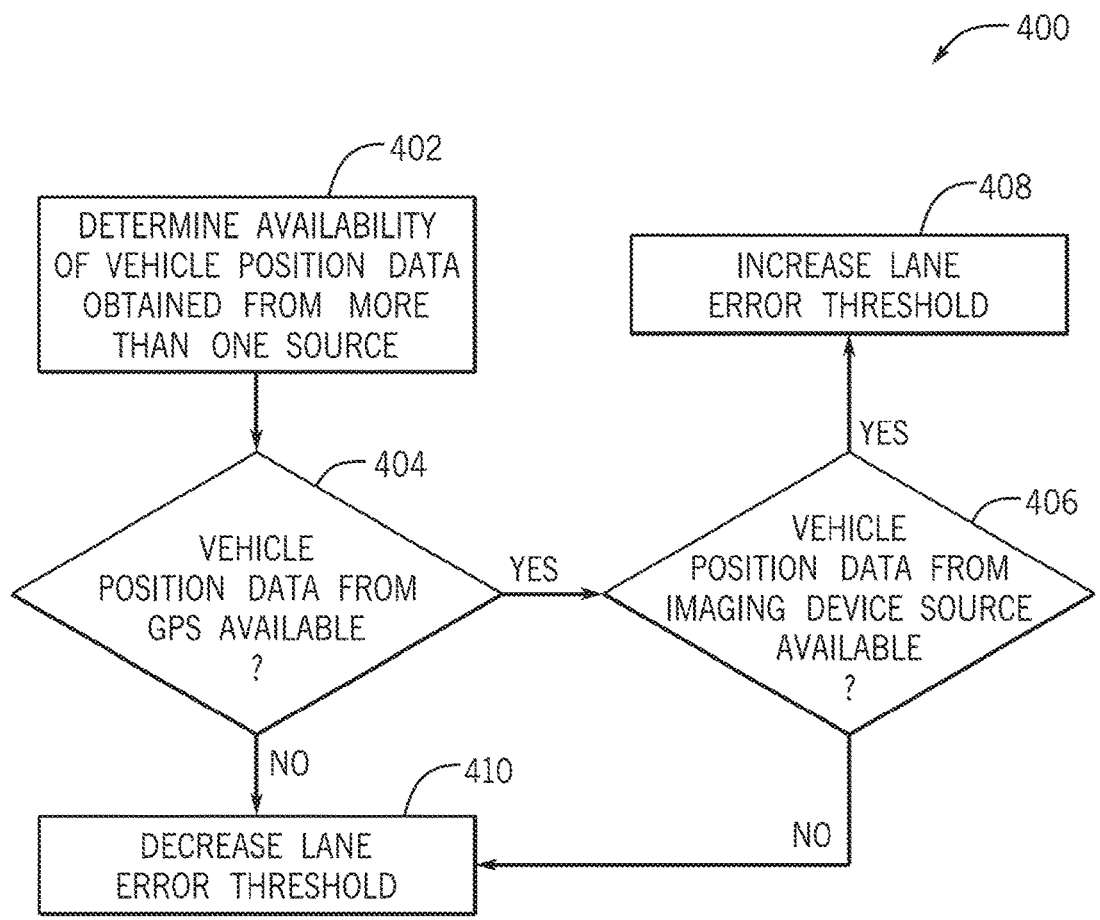
FIG. 4 is a flow diagram of an exemplary method for determining availability of vehicle position data according to an embodiment.

Further, at block 304, the method includes modifying a lane error threshold based on the availability of the vehicle position data. The lane error threshold is a lateral distance from a centerline of a lane. For example, the lane error module 116 can modify a lane error threshold based on the availability of the vehicle position data from the GPS device source 122 and the imaging device source 124. In one embodiment, the method can include calculating a modified lane error threshold based on the availability of the vehicle position data. FIG. 4 illustrates an exemplary method 400 for modifying the lane error threshold. Similar to block 302 of FIG. 2, at block 402, the method includes determining availability of vehicle position data obtained from more than one source including a GPS device source and an imaging device source. At block 404, it is determined if vehicle position data from the GPS device source 122 is available. If YES, at block 406, it is determined if vehicle position data from the imaging device source 124 is available. If YES, at block 408, the lane error threshold is modified by increasing the lane error threshold. Thus, upon determining vehicle position data obtained from the GPS device source 122 is available and vehicle position data obtained from the imaging device source 124 is available, modifying the lane error threshold includes increasing the lane error threshold. However, referring again to block 404, if vehicle position data from the GPS device source 122 is unavailable, the lane error threshold is modified by decreasing the lane error threshold at block 410. Similarly, at block 406, if vehicle position data from the imaging device source 124 is unavailable, the lane error threshold is modified by decreasing the lane error threshold at block 410.

Figure 5:
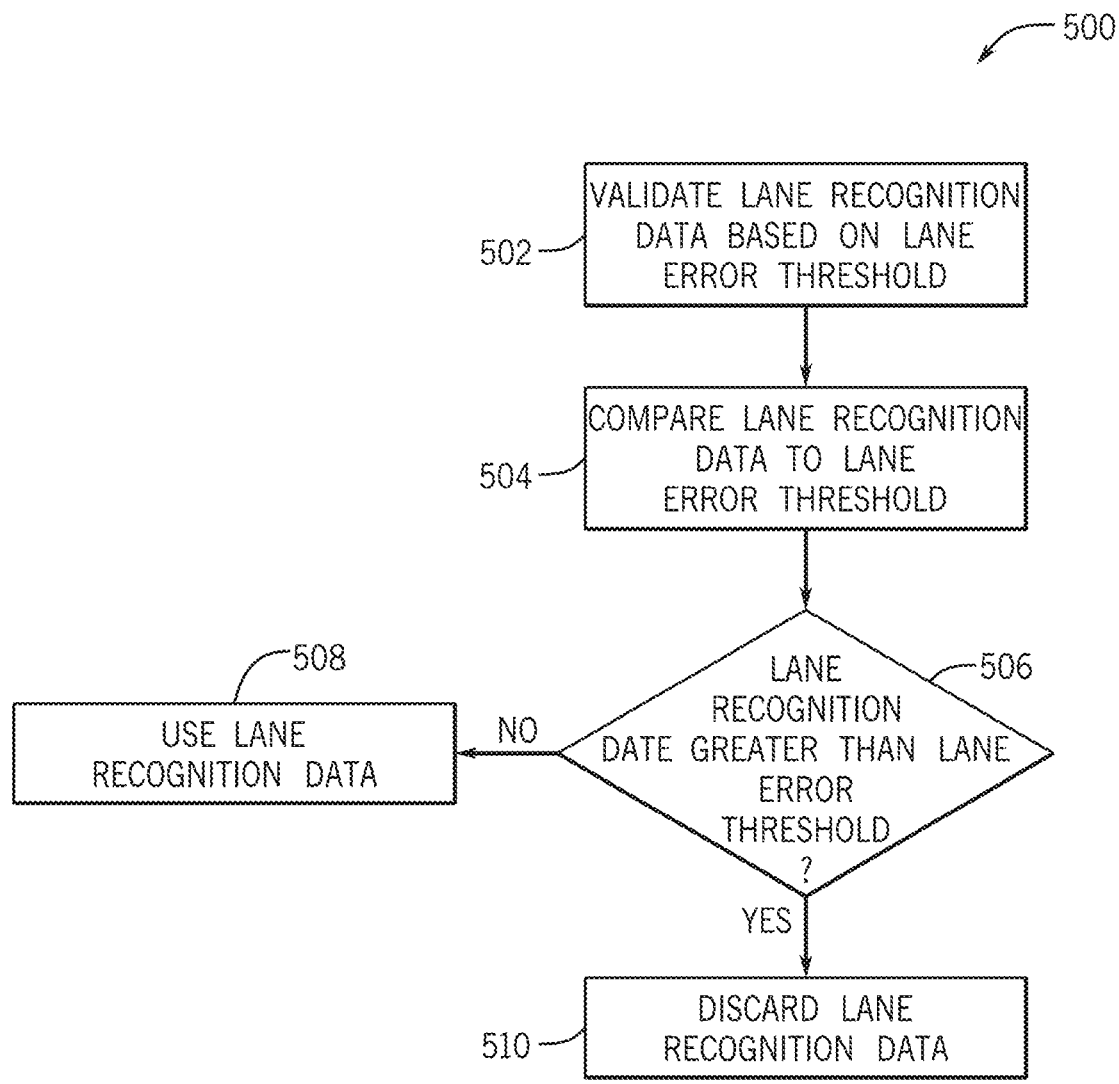
FIG. 5 is a flow diagram of an exemplary method for validating lane recognition data based on an lane error threshold according to an embodiment.

Referring again to FIG. 3, at block 306, the method includes validating lane recognition data based on the lane error threshold. For example, the lane recognition module 118 can validate lane recognition data based on the lane error threshold. FIG. 5 describes block 306 according to an exemplary method 500. Similar to FIG. 3, at block 502, the method includes validating lane recognition data based on the lane error threshold. In one embodiment, validating lane recognition data based on the lane error threshold includes comparing a distance of a vehicle from a centerline to the lane error threshold at block 504. At block 506, it is determined if the lane recognition data is greater than the lane error threshold. If NO, at block 508, the lane recognition data is validated and can be utilized for lane recognition. If the determination at block 506 is NO, the lane recognition data is invalid and at block 510, the lane recognition data can be discarded.

Figure 6:
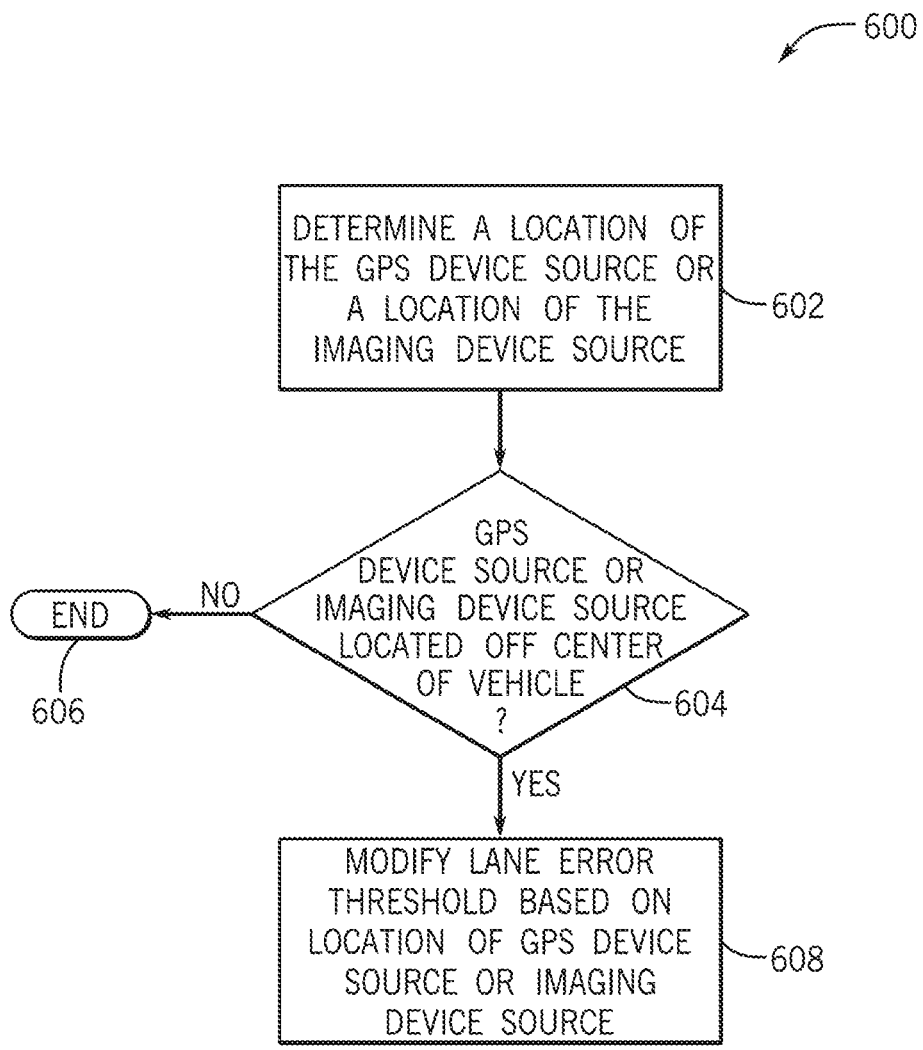
FIG. 6 is a flow diagram of an exemplary method for modifying the lane error threshold based on a determined location of the GPS device source or the imaging device source according to an embodiment

In an alternative embodiment, the method of FIG. 3 can also include determining a location of the more than one source including a location of the GPS device source and a location of the imaging device source and modifying the lane error threshold based on the location of the GPS device source and a location of the imaging device source. FIG. 6 illustrates an exemplary method 600 describing this alternative embodiment in detail. At block 602, the method includes determining a location of the more than one source including a location of the GPS device source and a location of the imaging device source. At block 604, it is determined if the GPS device source 122 and/or the imaging device source 124 is off-centered from the vehicle. If YES, at block 606, the method includes modifying the lane error threshold based on the location of the GPS device source and a location of the imaging device source. Otherwise, at block 608, the method ends. The lane error threshold determined and/or modified according to the method 600 can be used to validate lane recognition data as described in FIG. 3 at block 306.

The embodiments discussed herein may also be described and implemented in the context of non-transitory computer-readable storage medium storing computer-executable instructions. Non-transitory computer-readable storage media includes computer storage media and communication media. For example, flash memory drives, digital versatile discs (DVDs), compact discs (CDs), floppy disks, and tape cassettes. Non-transitory computer-readable storage media may include volatile and nonvolatile, removable and non-removable media implemented in any method or technology for storage of information such as computer readable instructions, data structures, modules, or other data. Non-transitory computer readable storage media excludes transitory and propagated data signals.

While various embodiments have been described, the description is intended to be exemplary, rather than limiting and it will be apparent to those of ordinary skill in the art that many more embodiments and implementations are possible that are within the scope of the embodiments. Accordingly, the embodiments are not to be restricted except in light of the attached claims and their equivalents. In addition, various modifications and changes can be made within the scope of the attached claims.

The invention claimed is:

1. A computer-implemented method for lane recognition by a lane keep assist system of a vehicle, wherein the vehicle is travelling on a road, comprising:
   determining, by a processor, availability of vehicle position data obtained by a GPS device and availability of vehicle position data obtained by an imaging device;
   modifying, by the processor, a lane error threshold of the lane keep assist system based on the availability of the vehicle position data obtained by the GPS device and the availability of the vehicle position data obtained by the imaging device;
   validating, by the processor, lane recognition data based on the lane error threshold; and
   performing the lane recognition by the lane keep assist system based on the lane error threshold and the lane recognition data.

2. The computer-implemented method of claim 1, wherein upon determining the vehicle position data obtained by from the GPS device is unavailable, modifying, by the processor, the lane error threshold of the lane keep assist system includes decreasing the lane error threshold.

3. The computer-implemented method of claim 1, wherein upon determining the vehicle position data obtained by the GPS device is available and the vehicle position data obtained by the imaging device is available, modifying, by the processor, the lane error threshold of the lane keep assist system includes increasing the lane error threshold.

4. The computer-implemented method of claim 1, wherein validating, by the processor, lane recognition data based on the lane error threshold includes comparing a distance of the vehicle from a center of a road to the lane error threshold.

5. The computer-implemented method of claim 4, wherein upon determining the distance is greater than the lane error threshold based on the comparison, the lane recognition data is discarded.

6. The computer-implemented method of claim 1, comprising determining, by the processor, a location of the GPS device and a location of the imaging device.

7. The computer-implemented method of claim 6, wherein modifying, by the processor, the lane error threshold of the lane keep assist system includes modifying the lane error threshold based on the location of the GPS device and the location of the imaging device.

8. A system for lane recognition for a vehicle travelling on a road, comprising:
   a vehicle position data source including a GPS device and an imaging device;
   a lane keep assist system of the vehicle for performing the lane recognition; and
   a processor operatively connected for computer communication with the vehicle data position source and the lane keep assist system, the processor including,
   a vehicle position data source module using the processor to determine availability of vehicle position data obtained from the GPS device and vehicle position data obtained from the imaging device;
   a lane error module using the processor to modify a lane error threshold based on the availability of the vehicle position data obtained from the GPS device and the availability of the vehicle position data obtained from the imaging device;
   a lane recognition module using the processor to validate lane recognition data based on the lane error threshold;
   wherein the lane keep assist system performs the lane recognition based on the lane error threshold and the lane recognition data.

9. The system for lane recognition of claim 8, wherein the vehicle position data source module using the processor determines availability of the vehicle position data obtained from the GPS device and the vehicle position data obtained from the imaging device based on a device status obtained by the vehicle position data source module from the GPS device and a device status obtained by the vehicle position data source module from the imaging device.

10. The system for lane recognition of claim 8, wherein upon the vehicle position data source module determining the vehicle position data obtained from the GPS device is unavailable, the lane error module using the processor modifies the lane error threshold by decreasing the lane error threshold.

11. The system for lane recognition of claim 8, wherein upon the vehicle position data source module determining the vehicle position data obtained from the GPS device is available and the vehicle position data obtained from the imaging device is available, the lane error module using the processor modifies the lane error threshold by increasing the lane error threshold.

12. The system for lane recognition of claim 8, wherein the lane recognition module validates lane recognition data based on the lane error threshold using the processor by determining whether the vehicle is deviating from a lane based on the lane error threshold.

13. The system for lane recognition of claim 8, wherein the vehicle position data source module using the processor determines a location of the GPS device or a location the imaging device.

14. The system for lane recognition of claim 13, wherein the lane error module using the processor modifies the lane error threshold based on the location of the GPS device or the location of the imaging device.

15. A non-transitory computer-readable medium storing computer-executable instructions that when executed by a computer, which includes at least a processor, cause the computer to perform a method, the method comprising:
   determining availability of vehicle position data obtained from a GPS device and vehicle position data obtained from an imaging device based on a device status obtained from the GPS device and a device status obtained from the imaging device;
   calculating a modified lane error threshold based on the availability of the vehicle position data; and
   validating lane recognition data based on the modified lane error threshold.

16. The non-transitory computer-readable medium of claim 15, wherein upon determining the vehicle position data obtained from the GPS device is unavailable, calculating the modified lane error threshold includes decreasing an initial lane error threshold.

17. The non-transitory computer-readable medium of claim 15, wherein upon determining the vehicle position data obtained from the GPS device is available and the vehicle position data obtained from the imaging device is available, calculating the modified lane error threshold includes increasing an initial lane error threshold.

18. The non-transitory computer-readable medium of claim 15, comprising determining a location of the GPS device or the imaging device on a vehicle.

19. The non-transitory computer-readable medium of claim 18, wherein calculating the modified lane error threshold includes calculating the modified lane error threshold based on the location of the GPS device or the imaging device on the vehicle.

20. The non-transitory computer-readable medium of claim 15, wherein validating lane recognition data includes comparing the lane recognition data with the modified lane error threshold.

\* \* \* \* \*